United States Patent [19]

Sofy

[11] Patent Number: 4,702,363
[45] Date of Patent: Oct. 27, 1987

[54] COMBINATION ELECTRIC AND MECHANICAL SERVO DRIVE CLUTCH

[75] Inventor: Hugh M. Sofy, Bloomfield Hills, Mich.

[73] Assignee: HMS Products Co., Troy, Mich.

[21] Appl. No.: 891,166

[22] Filed: Jul. 31, 1986

[51] Int. Cl.⁴ ................................................ F16D 7/00
[52] U.S. Cl. .................................. 192/150; 192/0.02 R; 74/27
[58] Field of Search ................ 192/0.02 R, 56 R, 150, 192/143, 144, 89 A, 101, 116.5; 74/27, 29, 30

[56] References Cited

U.S. PATENT DOCUMENTS

| | | | |
|---|---|---|---|
| 3,282,387 | 11/1966 | Becker et al. | 192/56 R |
| 4,330,052 | 5/1982 | Schymick | 192/143 X |
| 4,513,602 | 4/1985 | Sofy. | |
| 4,557,154 | 12/1985 | Iwata et al. | 192/56 R |

Primary Examiner—George H. Krizmanich
Attorney, Agent, or Firm—Lyman R. Lyon

[57] ABSTRACT

A clutch for mechanically and electrically disconnecting the servo drive of a reciprocable transfer mechanism comprises a housing having bores for the acceptance of a reciprocable piston and a transfer bar, respectively, said piston having a roller and said transfer bar having a groove for the acceptance thereof, and resilient means normally biasing the roller on said piston into the groove on said transfer bar whereby movement of said housing normally effects like movement of said transfer bar, movement of said roller out of the groove in said transfer bar effecting simultaneous mechanical disconnect of said servo drive and opening of a switch to effect electrical disconnect of said servo drive.

1 Claim, 4 Drawing Figures

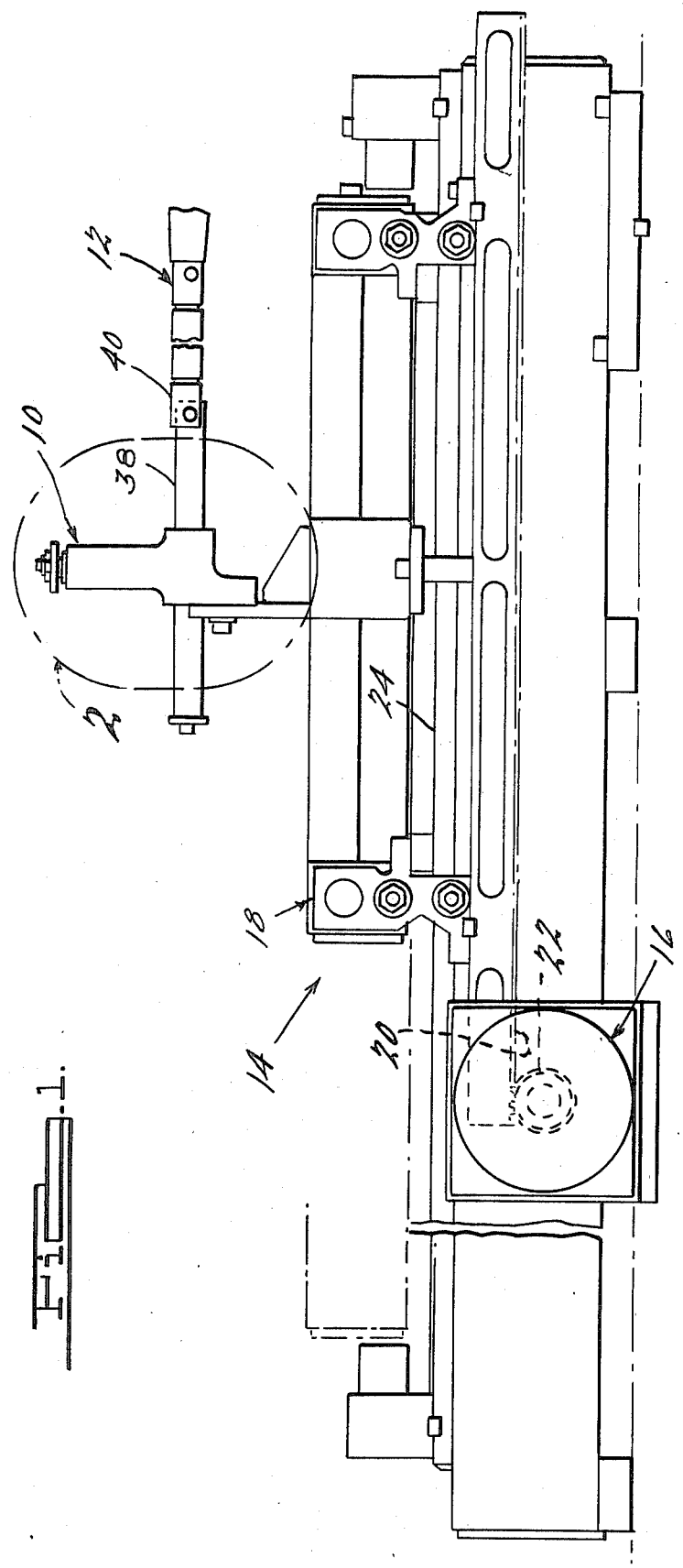

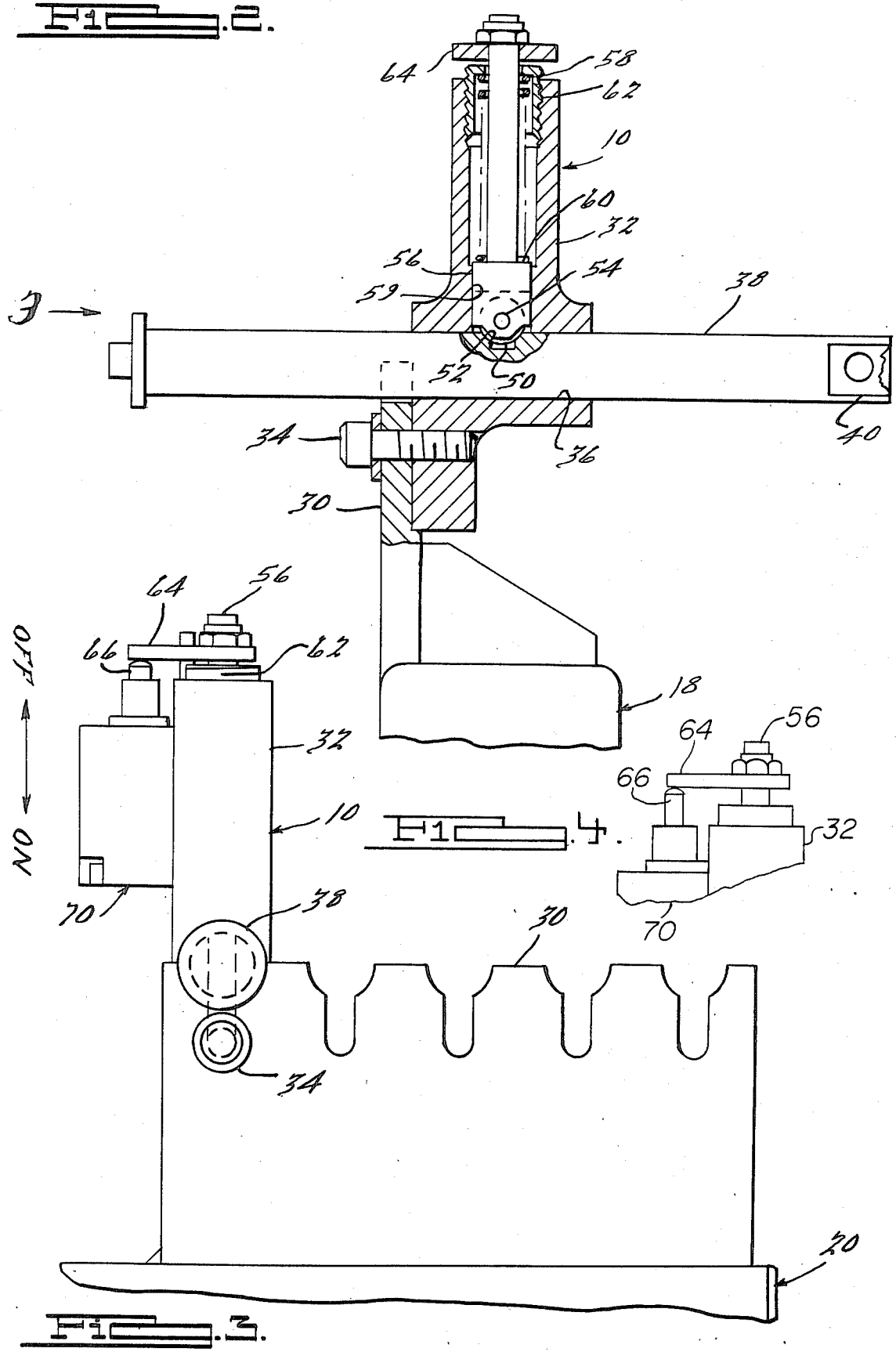

COMBINATION ELECTRIC AND MECHANICAL SERVO DRIVE CLUTCH

BACKGROUND OF THE INVENTION

It is known to use a mechanical clutch to disconnect a transfer device, of the type disclosed in U.S. Pat. No. 4,513,602 issued Apr. 30, 1985, from the prime mover therefor. As disclosed in said patent, the transfer mechanism is powered by the press itself and comprises reciprocating work gripping and handling jaws that transfer workpieces within the press.

When an electric servo drive is used as the power source for the transfer device, such servo drives have utilized only an electrical disconnect in the form of a current sensor in the servo motor energization circuit that senses an increase in armature current in the motor cicuit due to motor overload. However, modern high speed presses and transfer mechanisms require faster and more positive disconnect in the event of malfunction of the press or transfer mechanism to preclude "crashing" thereof.

SUMMARY OF THE INVENTION

The combination electric and mechanical servo drive clutch of the present invention comprises a piston and roller assembly that directly transmits movement of a reciprocable carriage to the transfer mechanism. The carriage is driven by a servo drive. In addition, a normally closed limit switch effects deenergization and braking of an electric drive motor of the servo drive. Deenergization of this switch is accomplished concomitantly with disengagement of the roller from its complementary drive detent. Mechanical disengagement of the prime mover from the transfer mechanism combined with electrical deenergization of the electric motor and braking thereof provides virtually instantaneous shutdown of the transfer mechanism minimizing the possibility of die damage due to an obstruction in the press.

BRIEF DESCRIPTION OF THE DRAWINGS

FIG. 1 is a side elevational view of an electric servo drive for a transfer mechanism;

FIG. 2 is a view taken within the circle 2 of FIG. 1;

FIG. 3 is a view taken in the direction of the arrow 3 of FIG. 2; and

FIG. 4 is a view of the electrical switch in the open position.

DETAILED DESCRIPTION OF THE PREFERRED EMBODIMENT OF THE INVENTION

As best seen in FIG. 1 of the drawings, a combination electrical and mechanical servo drive clutch assembly 10, in accordance with constructed embodiment of the instant invention, is shown in operative association with a drive link 12 of a transfer mechanism (not shown) and an electric servo drive mechanism 14. The servo drive mechanism 14 comprises a D.C. servo motor 16 that effects reciprocal movement of a carriage 18 through a rack 20 and pinion 22. The carriage 18 is supported for reciprocable movement by suitable ways 24.

As best seen in FIG. 2, an upstanding clutch support plate 30 is secured to the carriage 18 for the support of the clutch assembly 10. As seen in FIG. 3, the clutch assembly 10 can be mounted at different positions on the plate 30 as dictated by the requirements of a particular transfer mechanism.

As seen in FIG. 2 a clutch housing 32 is secured to the support plate 30 as by a machine screw 34. The housing 32 has a horizontal bore 36 therein that journals a drive shaft 38 which is secured to the drive link 12 of the transfer mechanism (not shown) by a connector 40.

In accordance with the present invention, the shaft 38 is mechanically yet releasably secured to the clutch housing 32 and therefore to the carriage 18 by the clutch 10 comprising a roller 50 that is accepted in a complementary recess 52 in the shaft 38. The roller 50 is journaled on a transverse shaft 54 mounted on a piston 56 which is free to reciprocate in a bore 59 in the housing 32. The piston 56 is normally biased to a locked or drive condition by a helical compression spring 58 which extends between a shoulder 60 on the piston 56 and an adjustment collar 62.

As seen in FIG. 3, a normally closed limit switch 70 is mounted on the housing 32. As seen in FIG. 4, upward movement of the piston 56 effects upward movement of a control arm 64 thereof releasing an actuator 66 of the switch 70 which opens the switch 70 thereby deenergizing the drive motor 16 and initiating braking thereof. It is to be noted that a two-pole switch 70 can be utilized to effect energization of an electric brake (not shown) for the motor 16 upon deenergization thereof.

In operation, rotation of the gear 22 by the servo motor 16 effects reciprocation of the rack 20, carriage 18, clutch assembly 10 and drive shaft 38. Upon the occurrence of an overload in the transfer mechanism (not shown) resistance to reciprocation of the shaft 38 results in camming of the roller 50 and piston 56 upwardly simultaneously mechanically disconnecting the link 38 from the clutch housing 32 on the carriage 18 and electrically disconnecting the servo motor 16. Disconnect of the servo drive 14 from the transfer mechanism (not shown) is thus fast and positive.

While disclosing the preferred embodiment of the invention, the direct detent assembly is susceptible to modification without departing from the scope of the following claims.

I claim:

1. A clutch for mechanically and electrically disconnecting the servo drive of a reciprocable transfer mechanism, said clutch comprising a clutch housing mounted for movement along a first axis by said electrical servo drive, said housing having a first bore extending at a right angle to the axis or reciprocation thereof, a reciprocable piston in said first bore, a roller journaled on said piston for rotation about an axis extending at a right angle to the reciprocable axis of said piston, a second bore in said housing extending parallel to the axis of reciprocation of said housing, a transfer bar journaled in said second bore, a groove in said transfer bar complementary to said roller for the acceptance thereof, resilient means normally biasing the roller on said piston into the groove on said transfer bar whereby movement of said housing normally effects like movement of said transfer bar, and a normally closed electrical switch on said housing controlled by the piston in said clutch housing, movement of said roller out of the groove in said transfer bar effecting simultaneous mechanical disconnect of said servo drive from said transfer mechanism and opening of said switch to effect electrical disconnect of said servo drive.

* * * * *